United States Patent [19]

Clark

[11] 4,292,546

[45] Sep. 29, 1981

[54] APPARATUS FOR CONTROLLING POWER APPLICATION

[76] Inventor: Warren P. Clark, 10 Evans Dr., Wilmington, Mass. 01887

[21] Appl. No.: 127,688

[22] Filed: Mar. 6, 1980

[51] Int. Cl.³ .......................................... H02J 13/00
[52] U.S. Cl. .................................... 307/114; 361/186; 340/310 CP
[58] Field of Search ................ 307/114, 115; 361/186; 340/310 CP

[56] References Cited

U.S. PATENT DOCUMENTS

| | | | |
|---|---|---|---|
| 941,777 | 11/1909 | Hart | 361/186 X |
| 3,971,028 | 7/1976 | Funk | 340/310 CP X |

Primary Examiner—L. T. Hix
Assistant Examiner—James L. Dwyer
Attorney, Agent, or Firm—Donald J. Singer; William Stepanishen

[57] ABSTRACT

A power control apparatus for applying or removing power to an electrical appliance that is remote with respect to the user. A power subunit which is connected to the appliance receives a signal from a remote control means to either apply or remove power to the appliance.

3 Claims, 1 Drawing Figure

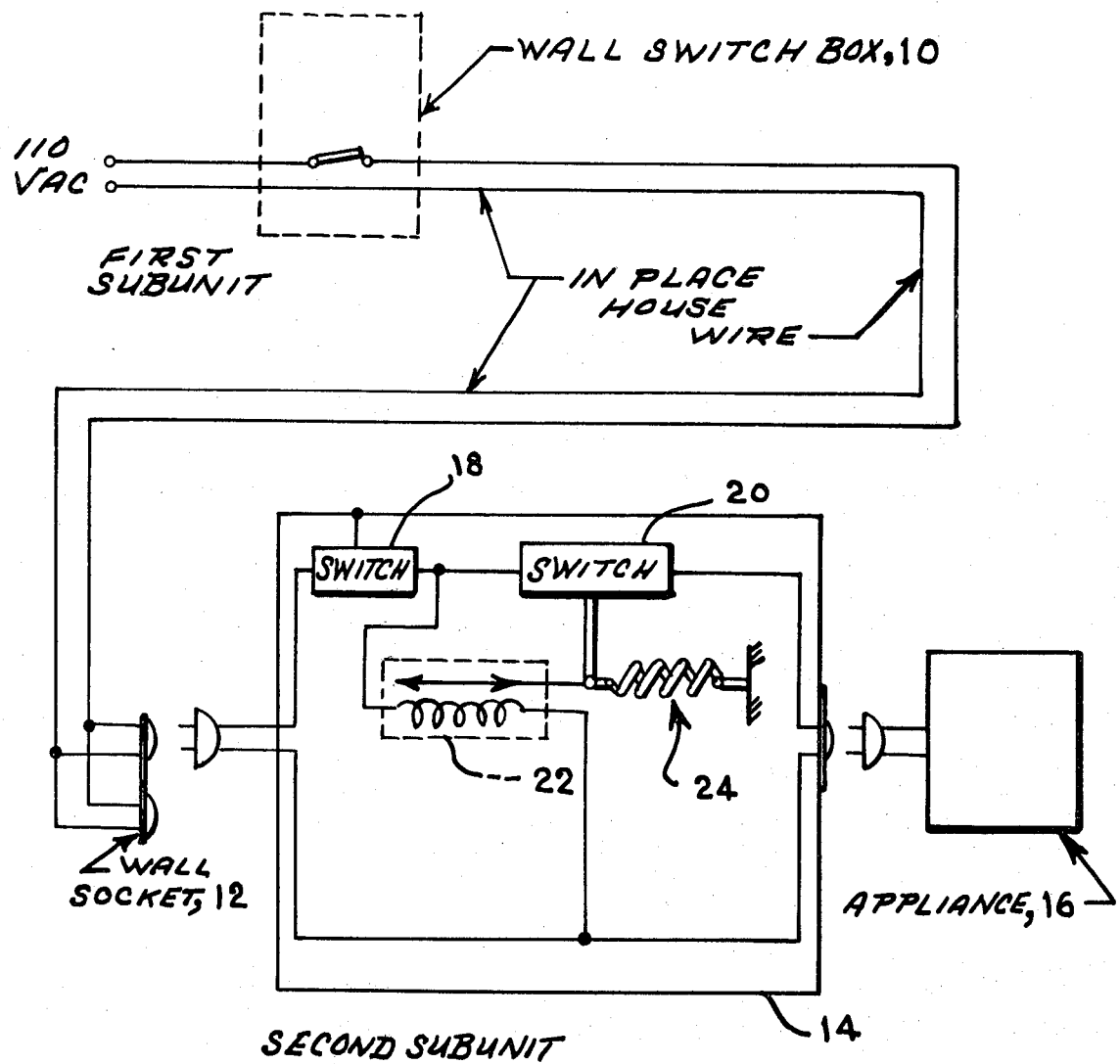

APPARATUS FOR CONTROLLING POWER APPLICATION

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to power switching circuits, and in particular to a remotely controlled appliance energizer apparatus.

In present day home-office electrical systems, it is well known that electrical appliances such as lights and lamps are controlled by wall mounted switches. These switches usually control one or more electrical outlets within a room to which an electrical appliance may be connected. Thus, when it is desired to turn the appliance, such as a lamp on, all that is necessary is to operate the wall switch. However, situations do exist wherein a lamp that turned on by a wall switch, for one reason or another, has been turned off by using the switch in the lamp itself. Thereupon once this situation has occurred, the lamp can only be turned on again by operation of the lamp switch which at the time of desired operation may be inconvenient due to some intervening occurrence such as darkness, etc. One way to handle such situations is to install two way or three way switch systems which permitted the operation of a lamp or the like from more than one location that is remote to the lamp. However, these two, three-way switch systems require special wiring such as three or four conductor wiring cables to complete such systems. The present invention provides a means of controlling remote devices without installing extra power or control wiring.

SUMMARY OF THE INVENTION

The present invention utilizes coded power interruption to control or send information to one or more remote electrical devices which are powered from alternating current or direct current power source and are remote from the control apparatus. An interruption of this current is a controlled manner anyplace between the power source and the device is detected at or near the device by a control subunit and directs the device to perform a particular function or change its state. The control apparatus uses a normally closed momentary action switch in the power line and an electrical or electromechanical machine at the device to detect this brief power interruption which causes the device to alternate its on or off state at each power interruption. The time duration of the interruption may be coded to permit several allowable commands or reduce the probability of accidental activation by power line transients or power outages. A sequence of interruptions in a predetermined coded sequence may provide even greater range of possible commands. A further operating mode may be achieved by encoding commands in alternating current by stopping a sequence of cycles or portions of cycles.

It is one object of the present invention, therefore, to provide an improved power control apparatus.

It is another object of the invention to provide an improved power control apparatus wherein the power to a device may be applied or removed remotely.

It is another object of the invention to provide an improved power control apparatus for controlling remote electrical devices without installing extra power or control wiring.

It is yet another object of the invention to provide an improved power control apparatus for sending commands or information to a remote device.

It is still another object of the invention to provide an improved power control apparatus wherein power to the device may be controlled locally as well as remotely.

These and other advantages, objects and features of the invention will become apparent after considering the following description taken in conjunction with the illustrative embodiment in the accompanying drawing.

BRIEF DESCRIPTION OF THE DRAWING

The sole FIGURE is a schematic diagram of the power control apparatus in accordance with the present invention.

DESCRIPTION OF THE PREFERRED EMBODIMENT

Referring now to the FIGURE, there is shown a power control apparatus utilizing a first subunit which is connected to the incoming power line and through normal house wiring to a second subunit. The first subunit 10 comprises a normally closed momentary action switch which controls the power to a wall socket 12. The second subunit 14 is connected between the wall socket 12 and an electrical appliance 16 which may be a lamp or other similar electrical device. The second subunit comprises a pair of switches 18, 20, a solenoid 22 and a spring 24. The switch 18 is positioned in the power path to the solenoid 22 to permit interruption of the power to the solenoid 22 in the second subunit 14. The switch 20 which controls the application of power to the appliance 16, is mechanically linked to the plunger of the solenoid 22. A spring 24 is attached to the arm of the switch 20 and the subunit frame to facilitate the operation of switch 20.

The present invention provides a system for control of an electrical appliance, such as a table lamp, from either a remote switch 10 on a wall or from a local switch 18 near the appliance. The first subunit 10 is utilized to replace the normal wall switch that may be located near the doorway to a room, and the second subunit 14 is plugged into the wall socket 12 which is normally controlled by the wall switch. The appliance 16 is plugged into the second subunit 14 and then may be switched either from the wall subunit 10 or a switch 18 on the second subunit 14. The appliance 16 may also have an on-off switch which must be left in the on position. The subunit 10 which replaces the normal wall switch is a simple normally closed momentary action switch which when depressed, interrupts the power to the second subunit 14 and the appliance 16 until the switch 20 is released. The second subunit 14 detects this power interruption and reverses the on or off status of the switch 20 and thereby controls the state of the appliance 16 which may be either electrical or electromechanical.

The power control apparatus operates in the following manner. The switch 18 is a normally closed momentary action switch similar to the wall switch in subunit 10. When the wall switch in subunit 10 and switch 18 in subunit 14 are left closed, the current flows through the solenoid 22. The current in the solenoid 22 pulls the mechanical linkage between the solenoid and the switch to hold the switch 20 in its left position. The switch 20 is an alternate action switch which changes state every time it is cycled. Depressing either the wall switch in subunit 10 or switch 18 causes a temporary interruption of the current in the solenoid 22 thus permitting the spring 24 to pull switch 20 to the right position. When the wall switch of subunit 10 or switch 18 is released, the current again flows through the solenoid 22 pulling the mechanical linkage and switch 20 to the left. This completes a cycle of alternate action switch 20 such that, if it was on before, it is now off and visa versa. The appliance which is plugged into the second subunit, is thus controlled by either the wall switch subunit 10 or the switch 20 on the second subunit 14.

The use of the present invention has been shown in its simplest implementation. In this form, the invention would include a normally closed momentary action switch in the power line and an electrical or electromechanical machine at the device to detect this brief power interruption causing the device to alternate its on or off state at each power interruption. An alternate implementation or use would utilize the time duration of the interruption to be coded to permit several allowable commands or reduce the probability of accidental activation by power line transients or power outages. Similarly, a sequence of interruptions in a predetermined coded sequence could given an even greater range of possible commands. An even more sophisticated implementation would encode commands in alternating current by stopping a sequence of cycles or portion of cycles.

Although the invention has been described with reference to a particular embodiment, it will be understood to those skilled in the art that the invention is capable of a variety of alternative embodiments within the spirit and scope of the appended claims.

What is claimed is:

1. A power control apparatus for applying or removing power to an electrical appliance comprising in combination:

a first power control means connected to input power lines to receive the power thereon, said input power lines being connected to a wall socket, said first power control means comprising a normally closed momentary action switch, said switch being serially connected in one of said input power lines, and, a second power control means connected to said wall socket by means of an electrical plug, said second power control means including a parallel pair of electrical wires from said electrical plug to an electrical socket mounted thereon, said second power control means comprising a solenoid means connected between said parallel pair of electrical wires, and a first and second switch means, said first switch means connected in one of said electrical wires between said electrical plug and said solenoid means, said second switch means connected from the junction of said first switch means and said solenoid means to said electrical socket, said electrical socket receiving the input plug of an electrical appliance which is to be controlled, said first switch means comprising a normally closed momentary action switch, said second switch means mechanically connected to the plunger of said solenoid means by a mechanical linkage, said mechanical linkage connected to the frame of said second power control means by a spring, said second switch means having a first and second switch position, said solenoid means holding said second switch means in said first switch position, said solenoid means responding to a temporary current interruption by allowing said second switch means to move to said second switch position, after said current interruption said solenoid means returns said second switch means to said first switch position, said second switch means being switched between an on state and an off state in response to said solenoid means reaction to said current interruption.

2. A power control apparatus as described in claim 1 wherein said first power control means switch is manually operated to cause said current interruption.

3. A power control apparatus as described in claim 1 wherein said first switch means is manually operated to cause said current interruption.

* * * * *